(12) United States Patent
Tachibana et al.

(10) Patent No.: US 6,341,586 B2
(45) Date of Patent: Jan. 29, 2002

(54) VALVE TIMING CONTROL SYSTEM FOR INTERNAL COMBUSTION ENGINE

(75) Inventors: Yosuke Tachibana; Junichi Suzuki; Tomoya Furukawa; Shun Masuda, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/735,480

(22) Filed: Dec. 14, 2000

(30) Foreign Application Priority Data

Dec. 24, 1999 (JP) ............................. 11-368025

(51) Int. Cl.[7] ................................. F01L 1/34
(52) U.S. Cl. ................... 123/90.15; 123/90.17
(58) Field of Search ................. 123/90.15, 90.16, 123/90.17, 90.31

(56) References Cited

U.S. PATENT DOCUMENTS 5,199,403 A * 4/1993 Akazaki et al. ............. 123/478
5,558,051 A * 9/1996 Yoshioka ................. 123/90.15
6,196,173 B1 * 3/2001 Takahashi et al. ........ 123/90.15

* cited by examiner

Primary Examiner—Wellun Lo
(74) Attorney, Agent, or Firm—Arent Fox Kintner Plotkin & Kahn, PLLC

(57) ABSTRACT

There is provided a valve timing control system for an internal combustion engine, which is capable of enhancing the accuracy of valve timing control. The valve timing control system 1 for the internal combustion engine 3 changes the cam phase of an intake cam 6a relative to a crankshaft 9, to thereby control the valve timing of an intake valve 4. The valve timing control system 1 fixes a desired cam phase CAINCMD at a value CAINCMDFC during an fuel cut-off, and controls a cam phase change mechanism 8 such that from a time t2 during the fuel cut-off, the cam phase is held at a value assumed at the time t2. Further, the valve timing control system 1 calculates a learned value DCALEARN of the amount of deviation of an actual cam phase CAIN based on a plurality of values of the actual cam phase CAIN detected at and after the time t2, and the constant value CAINCMDFC of the desired cam phase CAINCMD (step S5).

4 Claims, 4 Drawing Sheets

VALVE TIMING CONTROL SYSTEM FOR INTERNAL COMBUSTION ENGINE

BACKGROUND OF THE INVENTION

1. Field of the Invention

This invention relates to a valve timing control system for an internal combustion engine, which varies the cam phase, i.e. the phase angle of at least one of an intake cam and an exhaust cam for opening and closing an intake valve and an exhaust valve, respectively, relative to a crankshaft of the engine, to thereby control valve timing of corresponding one(s) of the intake valve and the exhaust valve.

2. Description of the Prior Art

Conventionally, a valve timing control system of the above-mentioned kind was proposed in Japanese Laid-Open Patent Publication (Kokai) No. 7-269380. This valve timing control system includes a solenoid control valve, and a cam phase change mechanism to which oil pressure is supplied via the solenoid control valve. In this valve timing control system, an operation amount is output to the solenoid control valve, whereby the oil pressure is supplied to the cam phase change mechanism via the solenoid control valve. The cam phase change mechanism includes two hydraulic chambers i.e. an advance chamber and a retard chamber. The oil pressure from the solenoid control valve is selectively supplied to one of the two hydraulic chambers, whereby the phase angle (hereinafter simply referred to as "the cam phase") of an intake cam relative to a crankshaft is advanced or retarded to thereby change the valve timing (opening/closing timing) of an intake valve.

Further, desired valve timing is calculated based on engine rotational speed and the amount of intake air, and the solenoid control valve is feedback-controlled such that detected valve timing becomes coincident with the desired valve timing. During the feedback control, a hold operation amount (operation amount at which the cam phase change mechanism neither advances nor retards the cam phase) is learned to enhance the accuracy of feedback control, and a leaned value of the hold operation amount is used to calculate the operation amount. The learned value is calculated by adding an amount of deviation of the operation amount to the current operation amount when the rate or speed of change in the valve timing is within a predetermined small range, and at the same time the amount of change in the operation amount is within a predetermined small range, that is, when the valve timing undergoes very small changes. The amount of deviation of the operation amount is read from a map set in advance such that values of the amount of deviation are indexed by respective values of the rate of change in the valve timing.

According to the above conventional valve timing control system, so long as the condition that the valve timing undergoes very small changes is satisfied, the calculation of the learned value is carried out irrespective of whether or not the cam phase change mechanism is in normal operation, or irrespective of whether or not the desired valve timing is being changed. Hence, it is sometimes impossible to obtain an appropriate learned value, resulting in the degraded accuracy of the feedback control. Further, although the calculation of the learned value is carried out when the valve timing undergoes very small changes, such a state of the valve timing is often terminated in a short time during actual operation of the internal combustion engine. This sometimes causes the learning process to be terminated before obtaining a sufficient number of samplings to calculate the appropriate learned value. In such a case, the use of the learned value results in the degraded accuracy of the feedback control.

SUMMARY OF THE INVENTION

It is an object of the invention to provide a valve timing control system for an internal combustion engine, which is capable of enhancing the accuracy of valve timing control.

To attain the above object, the present invention provides a valve timing control system for an internal combustion engine having a crankshaft, an intake valve, an exhaust valve, an intake cam for opening and closing the intake valve, and an exhaust cam for opening and closing the exhaust valve, the valve timing control system controlling valve timing of at least one of the intake valve and the exhaust valve by changing a cam phase which is a phase of at least one of the intake cam and the exhaust cam, relative to the crankshaft.

The valve timing control system according to the invention is characterized by comprising:

actual cam phase-detecting means for detecting the cam phase as an actual cam phase:

a cam phase change mechanism for changing the cam phase:

operating condition-detecting means for detecting operating conditions of the engine;

fuel cut-off determination means for determining whether or not fuel cut-off is being carried out for cutting off supply of fuel to the engine;

desired cam phase-setting means for setting a desired cam phase according to the detected operating conditions of the engine, and fixing the desired cam phase at a constant value during the fuel cut-off;

cam phase control means for controlling the cam phase change mechanism such that the cam phase change mechanism causes the cam phase to become equal to the desired cam phase, and holds the cam phase at and after a predetermined timing during the fuel cut-off; and actual cam phase deviation calculation means for calculating an amount of deviation of the actual cam phase based on a plurality of values of the actual cam phase detected at and after the predetermined timing during the fuel cut-off, and the constant value of the desired cam phase.

According to this valve timing control system, it is determined whether or not fuel cut-off is being carried out, and during the fuel cut-off, the desired cam phase is fixed at a constant value. Further, the cam phase change mechanism is controlled such that it causes the cam phase to become equal to the desired cam phase, and holds the cam phase at and after a predetermined timing during the fuel cut-off. The amount of deviation of the actual cam phase is calculated based on a plurality of values of the actual cam phase detected at and after the predetermined timing during the fuel cut-off and the constant value of the desired cam phase. Since fuel is not burned during the fuel cut-off, there is no need to change the desired cam phase, and hence the desired cam phase can be fixed to the constant value, as described above. Further, the fuel cut-off is not terminated immediately but often continues over a certain time period. Therefore, since the amount of deviation of (a detected value of) the actual cam phase from a correct value to be detected is calculated in a state in which the desired cam phase is fixed, and the cam phase is held after the predetermined timing, it is calculated not only based on the actual cam phase which has sufficiently converged on the desired cam phase but also when the converged state of the actual cam phase continues over a certain time period, differently from the conventional valve timing control system in which learning is carried out on condition that the valve timing undergoes very small changes, irrespective of whether or not the desired cam phase is being changed. This makes it possible to calculate a learned value of the amount of deviation more accurately reflecting an actual amount of deviation of the actual cam phase, whereby the amount of deviation of the actual cam phase can be calculated with higher accuracy. This makes it possible to correct the actual cam phase during the valve timing control by using a thus accurately calculated and hence a reliable learned value of the amount of deviation of the actual cam phase, and thereby enhance the accuracy of the valve timing control.

Preferably, the valve timing control system further includes actual cam phase-integrating means for integrating an amount of change in the actual cam phase before the fuel cut-off to obtain an integrated value, and calculation-permitting means for permitting the actual cam phase deviation calculation means to calculate the amount of deviation of the actual cam phase when the integrated value is equal to or larger than a predetermined value.

According to this preferred embodiment, the calculation of the amount of deviation is permitted on condition that the integrated value of the amount of change in the actual cam phase before the fuel cut-off is equal to or larger than the predetermined value. Generally, when the cam phase change mechanism is in operation without being inoperatively fixed, the integrated value of the amount of change in the actual cam phase becomes larger with the lapse of operation time of the mechanism. Therefore, by permitting the calculation of the amount of deviation of the actual cam phase on condition that the integrated value is equal to or larger than the predetermined value, it is possible to sample only data of the actual cam phase when the cam phase change mechanism is in operation while eliminating data of the same when the mechanism is inoperatively fixed. This makes it possible to fully enhance the reliability of the learned value of the amount of deviation of the actual cam phase, and hence further increase the accuracy of the valve timing control.

Preferably, the valve timing control system further includes follow-up delay determination means for determining based on a difference between the desired cam phase and the actual cam phase whether or not there occurs a follow-up delay of the actual cam phase with respect to the desired cam phase, and second calculation-permitting means for permitting the actual cam phase deviation calculation means to calculate the amount of deviation of the actual cam phase when it is determined by the follow-up delay determination means that there does not occurs the follow-up delay.

According to this preferred embodiment, the calculation of the amount of deviation of the actual cam phase is permitted when it is determined based on the difference between the desired cam phase and the actual cam phase that there does not occur a follow-up delay of the latter with respect to the former. In general, when the cam phase change mechanism is in normal operation, there does not occur the follow-up delay or the like, so that the difference between the desired cam phase and the actual cam phase is small, and a state, for instance, in which the difference is excessively large cannot continue for a long time period. Hence, it is possible to determine, based on the difference, whether or not there occurs the follow-up delay, i.e. delay of the actual cam phase in following up the desired cam phase. Therefore, by permitting the calculation of the amount of deviation of the actual cam phase when there occurs no follow-up delay, as described above, it is possible to sample data of the actual cam phase when the cam phase change mechanism is in normal operation, in other words, when the actual cam phase has converged on the desired cam phase. This makes it possible to further enhance the reliability of the learned value of the amount of deviation of the actual cam phase, and hence further increase the accuracy of the valve timing control.

The above and other objects, features, and advantages of the invention will become more apparent from the following detailed description taken in conjunction with the accompanying drawings.

DETAILED DESCRIPTION

Figure 1:
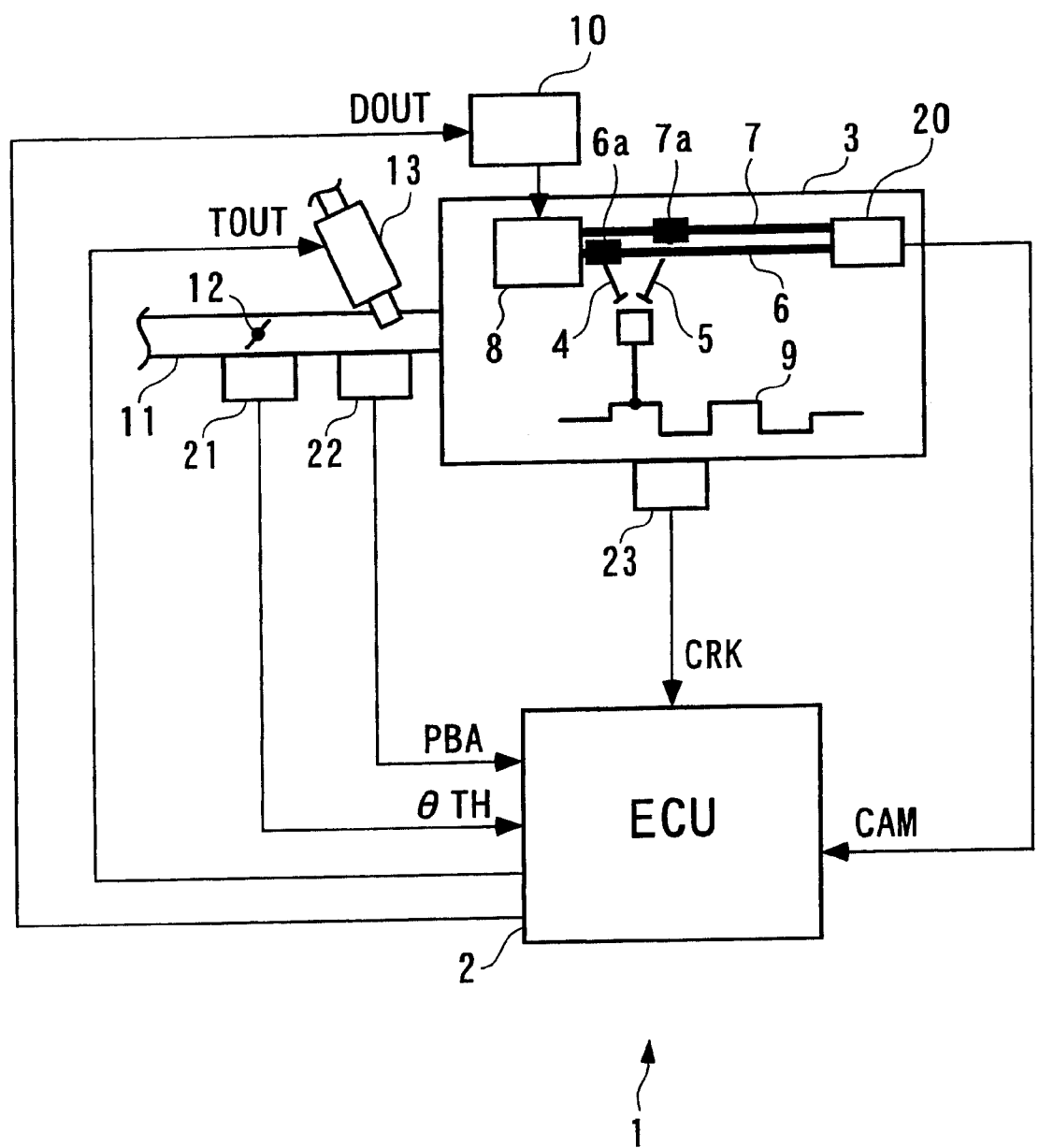
FIG. 1 is a block diagram schematically showing the arrangement of an internal combustion engine incorporating a valve timing control system according to an embodiment of the invention.

The invention will now be described in detail with reference to the drawings showing an embodiment thereof. Referring first to FIG. 1, there is schematically shown the arrangement of an internal combustion engine incorporating a valve timing control system according to an embodiment of the invention. As shown in the figure, the valve timing control system 1 includes an ECU 2 that carries out cam phase control, fuel cut-off control, and so forth in dependence on operating conditions of an internal combustion engine (hereinafter simply referred to as "the engine") 3.

The engine 3 is a four-stroke cycle DOHC (double overhead camshaft) gasoline engine, which includes an intake camshaft 6 and an exhaust camshaft 7. The intake camshaft 6 has intake cams 6a (only one of them is shown) for opening and closing respective intake valves 4 (only one of them is shown) during operation of the engine 3. The exhaust camshaft 7 includes exhaust cams 7a (only one of them is shown) for opening and closing respective exhaust valves 5 (only one of them is shown). The intake and exhaust camshafts 6, 7 are connected to a crankshaft 9 by a timing belt, not shown, for rotating through 360 degrees as the crankshaft 9 rotates through 720 degrees. A cam phase change mechanism 8 (VTC) is arranged at one end of the intake camshaft 6.

The cam phase change mechanism 8 includes two hydraulic chambers, i.e. an advance chamber, not shown, and a retard chamber, not shown. Oil pressure is selectively supplied to one of these two hydraulic chambers, whereby the phase angle (hereinafter simply referred to as "the cam phase") of the intake cam 6a relative to the crankshaft 9 is continuously advanced or retarded. This advances or retards the opening/closing timing of the intake valves 4. Further, the cam phase change mechanism 8 is connected to a solenoid control valve 10 (cam phase control means) which is responsive to a drive signal from the ECU 2 for being driven thereby to selectively supply the oil pressure from an hydraulic pump, not shown, of a lubricating system of the engine 3 to one of the advance chamber and the retard chamber, according to the duty ratio DOUT (%) of the drive signal. This causes the cam phase change mechanism 8 to advance or retard the cam phase. The angle between the most retarded position and the most advanced position of the cam phase change mechanism 8 is set to a predetermined value (e.g. 30 degrees of cam angle).

Further, the solenoid control valve 10 simultaneously closes the advance chamber and the retard chamber when the received drive signal has a predetermined hold duty ratio (e.g. 50%). This causes the cam phase change mechanism 8 to hold (fix) the cam phase assumed when the chambers were closed, without retarding or advancing the same any longer.

A cam angle sensor 20 (actual cam phase-detecting means) is arranged at the other end of the intake camshaft 6, opposite to the one end at which the cam phase change mechanism 8 is arranged. The cam angle sensor 20 is comprised e.g. of a magnet rotor and an MRE (magnetic resistance element) pickup, and delivers a cam signal, which is a pulse signal, to the ECU 2 whenever the camshaft 6 rotates through a predetermined angle (e.g. one degree). The ECU 2 calculates an actual cam phase CAIN, i.e. a detected cam phase, based on the cam signal and a CRK signal, referred to hereinafter.

The engine 3 has an intake pipe 11 having a throttle valve 12 arranged in an intermediate portion thereof and a throttle valve opening sensor 21 (operating condition-detecting means) inserted into the intermediate portion. The throttle valve 12 is driven by the ECU 2 via a solenoid actuator, not shown, to have an opening degree θTH thereof (hereinafter referred to as the throttle valve opening θTH) varied between a fully open position and a fully closed position. Further, the throttle valve opening sensor 21 detects the throttle valve opening θTH (parameter representative of an operating condition of the engine 3) to deliver a signal indicative of the sensed throttle valve opening θTH to the ECU 2.

Further, injectors 13 (only one of them is shown) and an intake pipe absolute pressure sensor 22 (operating condition-detecting means) formed e.g. by a semiconductor pressure sensor are inserted into the intake pipe 11 at respective locations downstream of the throttle valve 12. Each injector 13 is driven by a drive signal from the ECU 2, and injects fuel into the intake pipe 11 only during a fuel injection time period TOUT over which it is driven by the drive signal. The intake pipe absolute pressure sensor 22 senses an intake pipe absolute pressure PBA (parameter representative of an operating condition of the engine 3) within the intake pipe 11, and delivers a signal indicative of the sensed absolute pressure PBA to the ECU 2.

The engine 3 has the crankshaft 9 to which is mounted a crank angle position sensor 23 (cam phase detection means, operating condition-detecting means). The crank angle position sensor 23 is constructed e.g. similarly to the above cam angle sensor 20, and delivers the CRK signal, which is a pulse signal, to the ECU 2 whenever the crankshaft 9 rotates through a predetermined angle (e.g. one degree). The ECU 2 determines an engine rotational speed NE (parameter representative of an operating condition) of the engine 3, based on the CRK signal. Further, the ECU 2 determines the actual cam phase CAIN based on the CRK signal and the cam signal from the cam angle sensor 20, as described hereinabove.

The ECU 2 (actual cam phase-detecting means, operating condition-detecting means, fuel cut-off determination means, desired cam phase-setting means, cam phase control means, actual cam phase deviation calculation means, actual cam phase-integrating means, calculation-permitting means, follow-up delay determination means, second calculation-permitting means) is formed by a microcomputer including an I/O interface, a CPU, a RAM, and a ROM, none of which are specifically shown. The signals from the sensors 20 to 23 are each input to the CPU after A/D conversion and waveform shaping by the I/O interface. The CPU determines an operating condition of the engine 3 based on these signals, and sets the duty ratio DOUT of the solenoid control valve 10, the fuel injection time period TOUT of the injectors 13, and so forth, according to a control program stored beforehand in the ROM, and data stored in the RAM. Further, the CPU outputs drive signals indicative of the duty ratio DOUT, the fuel injection time period TOUT, etc. to thereby carry out cam phase control, fuel cut-off (hereinafter referred to as "F/C operation") control, and a deviation amount calculation process for calculating an amount of deviation of (detected value of) the actual cam phase CAIN from a correct value to be detected, during the F/C operation.

In the cam phase control, a desired cam phase CAINCMD is calculated based on operating conditions (e.g. the engine rotational speed NE, the intake pipe absolute pressure PBA, etc.) of the engine 3, and the cam phase change mechanism 8 is controlled in a feedback or feedforward manner such that the actual cam phase CAIN which is corrected as described hereinafter becomes equal to the desired cam phase CAINCMD. Further, as described hereinafter, during the F/C operation, the desired cam phase CAINCMD is fixed at a value CAINCMDFC assumed at a time point of the start of the F/C operation (time t1 shown in FIG. 3), and the feedback control of the cam phase is executed over a predetermined time period tset from the start of the F/C operation. Further, when the predetermined time period tset has elapsed (at a time t2 shown in FIG. 3), the duty ratio of the solenoid control valve 10 is set to the predetermined hold duty ratio, whereby the cam phase is held at a value assumed when the predetermined time period tset has elapsed (at the time t2 shown in FIG. 3).

Figure 2:
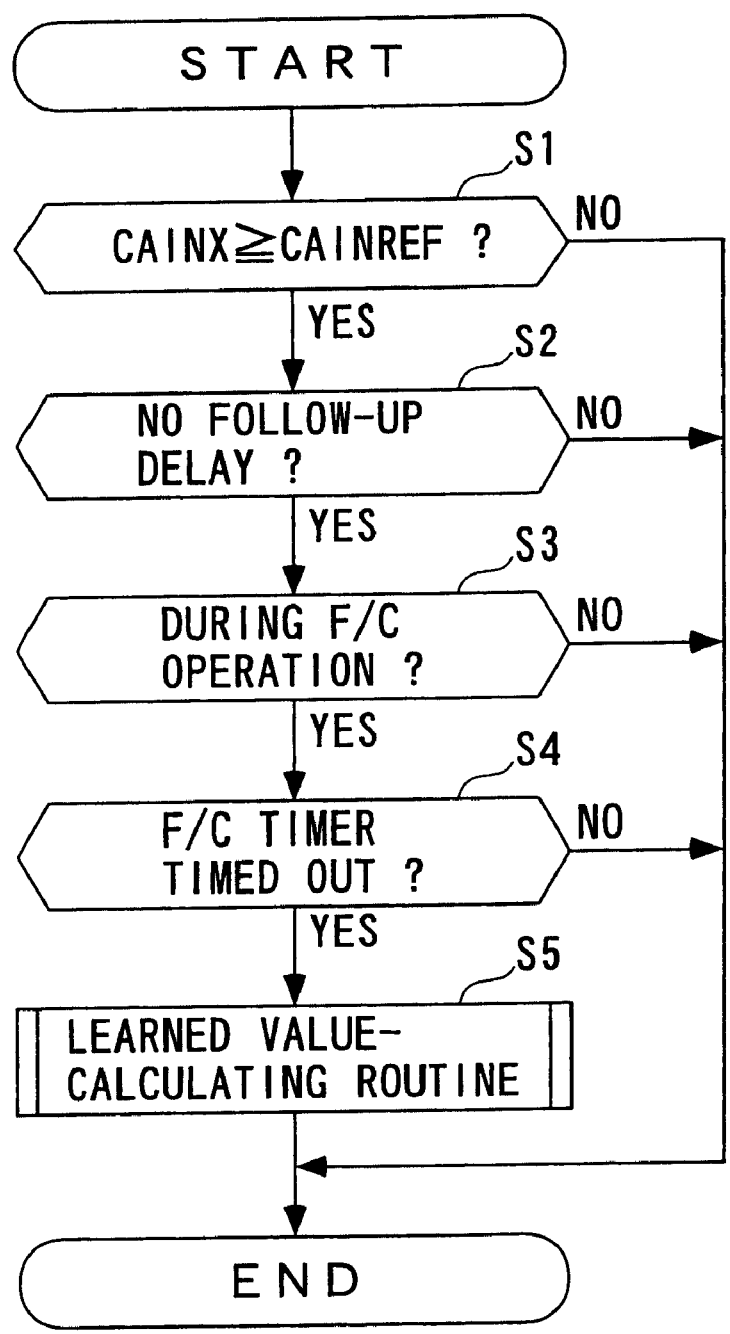
FIG. 2 is a flowchart showing a learned value-calculating process carried out by the valve timing control system for calculating a learned value of an amount of deviation of an actual cam phase.

In the following, a learned value-calculating process carried out by the ECU 2 during the F/C operation for calculating a learned value of the amount of deviation of the actual cam phase CAIN will be described. FIG. 2 shows a flowchart for a routine of the learned value-calculating process which is executed at predetermined time intervals (e.g. every 10 msec.) according to the settings of a timer.

As shown in FIG. 2, in the learned value-calculating process, first, it is determined at a step S1 whether or not the integrated value CAINX of the amount of change in the actual cam phase CAIN is equal to or larger than a predetermined value CAINREF. The integrated value CAINX is obtained by integrating or adding up absolute values of the amount of change in the actual cam phase CAIN occurring in the retarding or advancing direction over a time period from the start of the engine 3 to the present time point. Generally, when the cam phase change mechanism 8 is in proper operation without being inoperatively fixed, the integrated value CAINX becomes larger with the lapse of operation time of the mechanism. Therefore, the determination at the step S1 permits sampling of data of the actual cam phase CAIN only when the cam phase change mechanism 8 is in proper operation while eliminating data of the same when the cam phase change mechanism 8 is inoperatively fixed. Further, the predetermined value CAINREF is set to a value (e.g. 60 degrees of cam angle) large enough to consider that the cam phase change mechanism 8 has been operating without being inoperatively fixed from the start of the engine 3 to the present time point.

Figure 4:
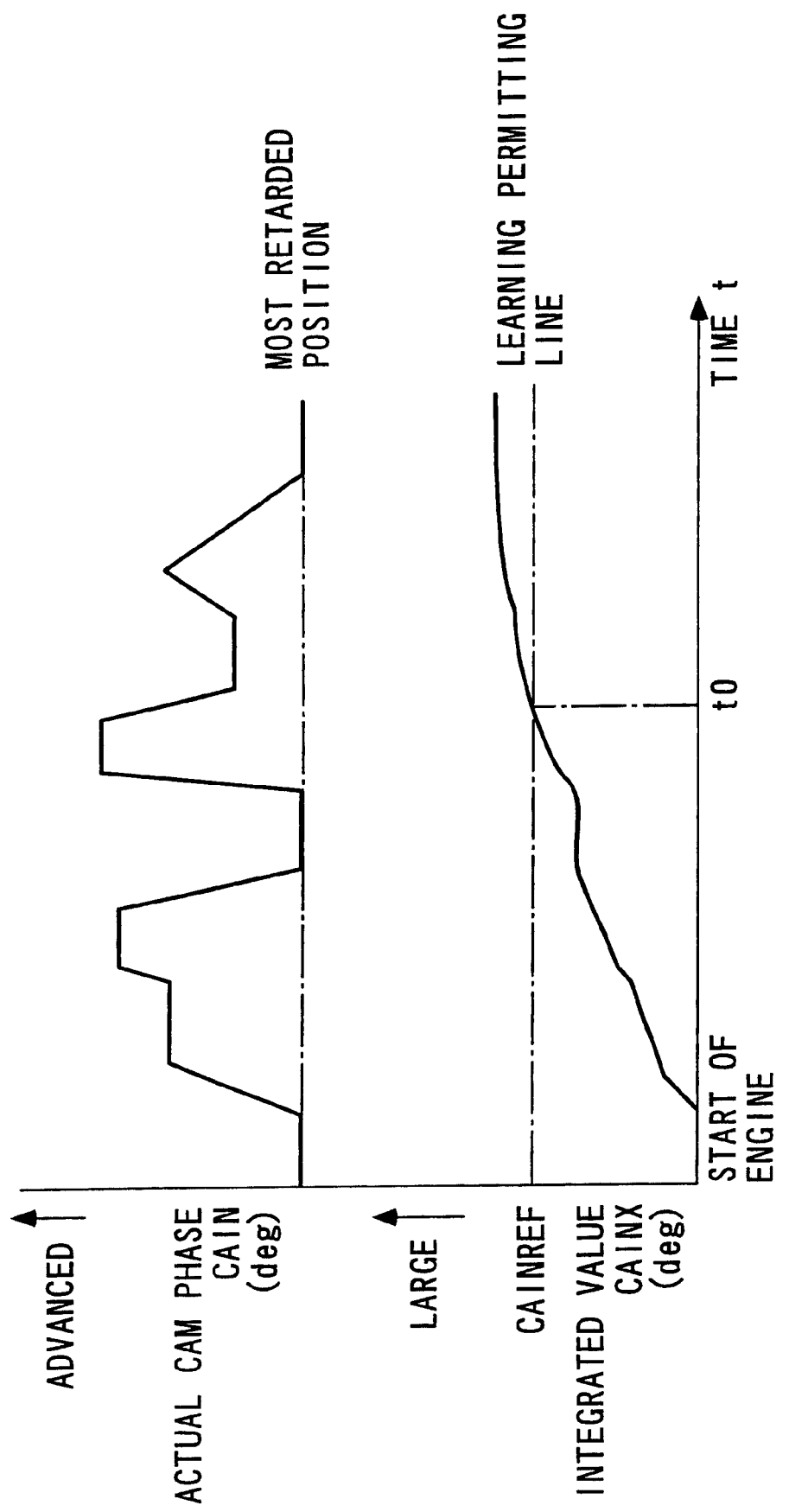
FIG. 4 is a timing chart showing an example of changes in an actual cam phase CAIN and corresponding changes in an integrated value CAINX.

A timing chart shown in FIG. 4 illustrates an example of changes in the actual cam phase CAIN and corresponding changes in the integrated value CAINX. In the illustrated example, as the actual cam phase CAIN changes with the lapse of time, the integrated value CAINX of the amount of change in the actual cam phase CAIN is increased to become equal to the predetermined value CAINREF at a time t0 after the start of the engine 3, and larger thereafter.

If the answer to the question of the step S1 is negative (No), i.e. if CAINX<CAINREF holds, the program is immediately terminated. On the other hand, if the answer to the question of the step S1 is affirmative (Yes), i.e. if CAINX≧CAINREF holds, the program proceeds to a step S2, wherein it is determined whether or not there is a follow-up delay of the cam phase change mechanism 8. This determination is carried out in the following manner: Time periods are integrated or added up over which the difference DCAIN between the desired cam phase CAINCMD and the actual cam phase CAIN calculated during the cam phase control before the start of the F/C operation is equal to or larger than a predetermined value #DCAIN to obtain an integrated time tint, and if the integrated time tint is smaller than a predetermined value tref, it is determined that there is no follow-up delay of the cam phase change mechanism, whereas if the integrated time tint is equal to or larger than the predetermined value tref, it is determined that there is the follow-up delay. The integrated time tint is reset when the value of a F/C flag, referred to hereinafter, is set to "1". The determination at the step S2 permits the amount of deviation of the actual cam phase CAIN to be calculated only when the cam phase change mechanism 8 is in normal operation, in other words, when the actual cam phase CAIN has converged on the desired cam phase CAINCMD.

If the answer to the question of the step S2 is negative (No), i.e. if it is determined that there is the follow-up delay, the program is immediately terminated. On the other hand, if the answer to the question of the step S2 is affirmative (Yes), i.e. if it is determined that there is no follow-up delay, the program proceeds to a step S3, wherein it is determined whether or not the engine 3 is in the F/C operation. This determination is carried out with reference to the value of the F/C flag. The F/C flag is set to "1" by the F/C operation control when the throttle valve opening θTH is in the fully closed position, and at the same time the engine 3 is in a decelerating condition at an engine rotational speed NE equal to or smaller than a predetermined value #NE (e.g. 4000 rpm), determining that the F/C operation should be carried out. If any of these conditions is not satisfied, the F/C flag is set to "0".

If the answer to the question of the step S3 is negative (No), i.e. if it is determined that the engine 3 is not in the F/C operation, the program is immediately terminated. On the other hand, if the answer to the question of the step S3 is affirmative (Yes), i.e. if the engine 3 is in the F/C operation, the program proceeds to a step S4, wherein it is determined whether or not an F/C timer has timed out. The F/C timer is a downcount timer for measuring a time period elapsed after the start of the F/C operation and set to the predetermined time period tset in synchronism with the timing of the above F/C flag being set to "1" to start measuring the elapsed time. The predetermined time period tset is provided for determining whether or not the feedback control of the cam phase is carried out over a sufficiently long time period after the start of the F/C operation for the cam phase to converge on a desired cam phase CAINCMDFC set at a time point of the start of the F/C operation, and set to a value large enough to properly carry out the determination.

If the answer to the question of the step S4 is negative (No), i.e. if it is determined that the F/C timer has not timed out, the program is immediately terminated. On the other hand, if the answer to the question of the step S4 is affirmative (Yes), i.e. if the above predetermined time period tset has elapsed, it is determined that the cam phase has sufficiently converged, and the program proceeded to a step S5, wherein a learned value-calculating routine is carried out for calculating the learned value of the amount of deviation of the actual cam phase CAIN, followed by terminating the program.

In the learned value-calculating routine, values of the actual cam phase CAIN detected during the F/C operation are averaged to thereby obtain an average value CAINAVE of the actual cam phase CAIN, and a difference between the average value CAINAVE and the desired cam phase CAINCMD is calculated as the learned value DCALEARN of the amount of deviation of the actual cam phase CAIN. More specifically, a present value CAIN(n) of the actual cam phase CAIN and an immediately preceding value CAINAVE (n−1) of the average value CAINAVE obtained in the immediately preceding loop are multiplied by respective predetermined weighting coefficients and added up to calculate the present value CAINAVE(n) of the average value CAINAVE. Then, a difference between the present value CAINAVE(n) of the average value and the predetermined value CAINCMDFC of the desired cam phase CAINCMD fixed at the time point of the start of the F/C operation is stored in the RAM as the learned value DCALEARN of the amount of deviation of the actual cam phase CAIN. The learned value DCALEARN stored in the RAM at the time point (time t3 shown in FIG. 3) of completion of the F/C operation is used as a correction value for correcting the actual cam phase CAIN in cam phase control carried out thereafter.

Figure 3:
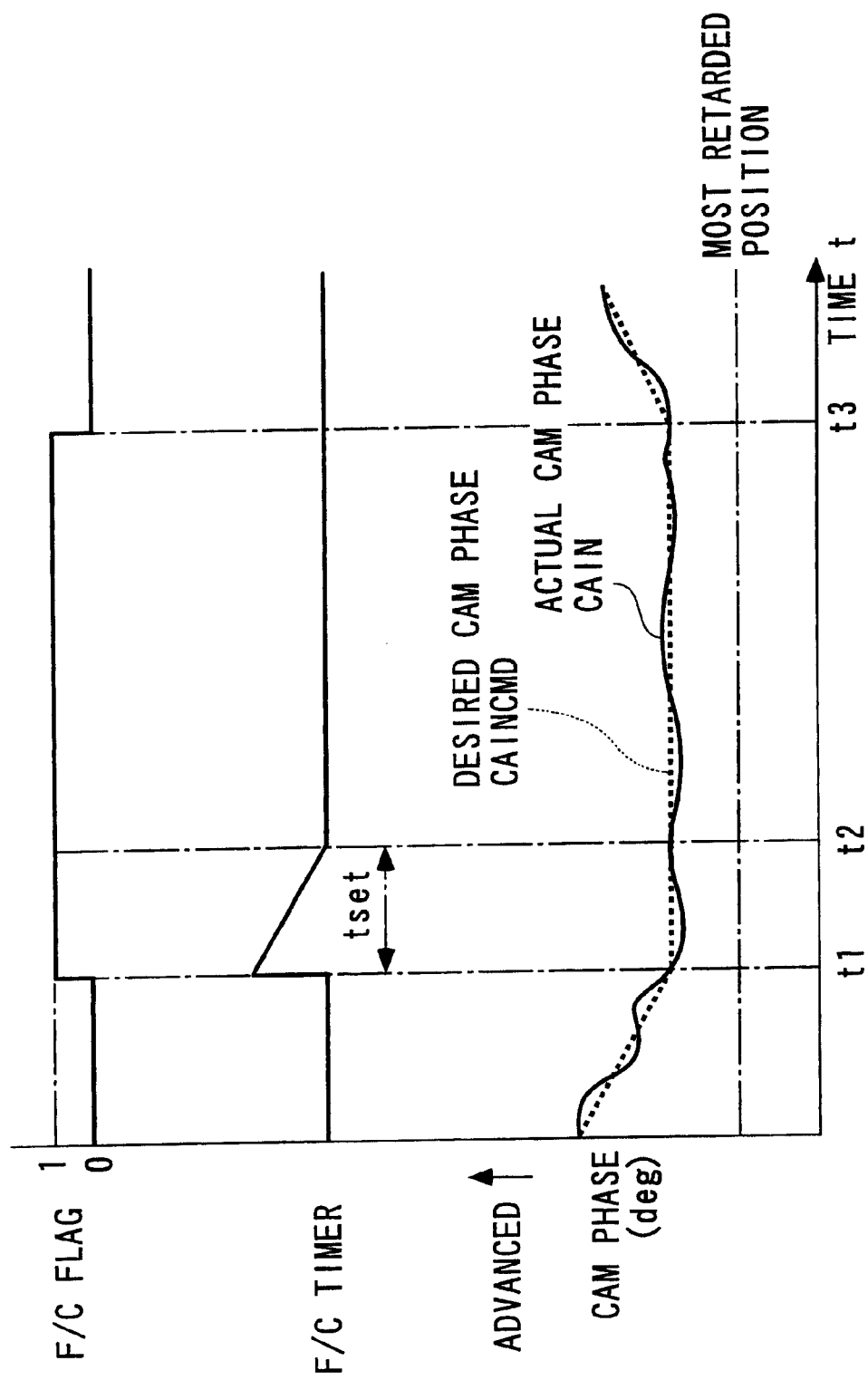
FIG. 3 is a timing chart showing an example of changes in cam phase which occur during a fuel cut-off F/C operation of the engine.

FIG. 3 is an example of a timing chart showing changes in the cam phase which occur during the F/C operation. As shown in the figure, when the F/C flag is set to "1" at the time t1, the F/C timer is set to the predetermined time period tset in synchronism with the setting of the F/C flag, and starts measuring elapsed time. Simultaneously, the desired cam phase CAINCMD is fixed at the value CAINCMDFC assumed at the time t1. Form this time, the feedback control of the cam phase continues to be carried out until the F/C timer times out, whereby the cam phase is caused to converge on the value CAINCMDFC. At the time t2 when the F/C timer times out, the feedback control is terminated, and the drive signal having the predetermined hold duty ratio, referred to hereinabove, is supplied to the solenoid control valve 10, whereby the cam phase change mechanism 8 holds (fixes) the cam phase at a value assumed at the time t2.

From the time t2, the learned value-calculating routine for calculating the learned value of the amount of deviation of the actual cam phase CAIN continues to be carried out until the time t3 at which the F/C operation is completed. In other words, at the time t3, the F/C flag is set to "0" to terminate the F/C operation, and the learned value-calculating routine is terminated. From the time t3 on, the desired cam phase CAINCMD is calculated based on operating conditions of the engine 3, and the actual cam phase CAIN is corrected based on the learned value DCALEARN of the amount of deviation of the actual cam phase CAIN, while the feedback control or feedforward control of the cam phase is executed such that the actual cam phase CAIN corrected as above becomes equal to the desired cam phase CAINCMD.

As described in detail heretofore, according to the valve timing control system of the present embodiment, the desired cam phase CAINCMD is fixed at the predetermined value CAINCMDFC during the F/C operation, and the cam phase is held at a value assumed (at the time t2) at a predetermined timing event during the F/C operation, by the cam phase change mechanism. The learned value DCALEARN of the amount of deviation of the actual cam phase CAIN is calculated as a difference between the average value CAINAVE of a plurality of values of the actual cam phase CAIN detected after the predetermined timing event, and the fixed value CAINCMDFC of the desired cam phase CAINCMD. In many cases, the fuel cut-off is not terminated immediately but often continued for a certain time period.

Therefore, differently from the conventional control system in which learning is carried out on condition that the valve timing undergoes very small changes, irrespective of whether or not a desired cam phase CAINCMD is being changed, the learned value DCALEARN is calculated not only based on the actual cam phase CAIN having sufficiently converged on the fixed value CAINCMDFC of the desired cam phase CAINCMD but also when the converged state of the actual cam phase CAIN continues for a certain time period. This makes it possible to calculate the leaned value DCALEARN more accurately reflecting the actual amount of deviation of the actual cam phase CAIN, whereby the amount of deviation of the actual cam phase CAIN due to the aging or variation among lots of component parts of the system can be calculated with higher accuracy. This makes it possible to correct the actual cam phase CAIN by using the learned value DCALEARN of the amount of deviation calculated as above with accuracy in execution of valve timing control, thereby enhancing the accuracy of the valve timing control.

Further, calculation of the learned value DCALEARN of the amount of deviation is permitted, when the integrated value CAINX of the amount of change in the actual cam phase CAIN before an F/C operation is equal to or larger than the predetermined value CAINREF, and at the same time when the integrated value tint of time periods over which the difference DCAIN between the desired cam phase CAINCMD and the actual cam phase CAIN is equal to or larger than the predetermined value #DCAIN is smaller than a predetermined value tref. In other words, the learned value DCALEARN is calculated only when the cam phase change mechanism 8 is operating without being inoperatively fixed, and without follow-up delay. This makes it possible to further enhance the reliability of the calculated learned value DCALEARN of the amount of deviation of the actual cam phase CAIN, and hence further increase the accuracy of the valve timing control. Further, the amount of deviation of the actual cam phase CAIN is not learned before the F/C timer times out, that is, until a time period has elapsed which is long enough to assume that the actual cam phase CAIN has sufficiently converged on the fixed value CAINCMDFC. This makes it possible to further increase the reliability of the calculated learned value DCALEARN of the amount of deviation of the actual cam phase CAIN.

Although the above-mentioned embodiment is applied to a valve timing control system for controlling the cam phase of each intake cam 6a, this is not limitative, but the same may be applied to a valve-timing control system for controlling the cam phase of each exhaust cam 7a, or for controlling the cam phase of each intake cam 6a and the cam phase of each exhaust cam 7a. That is, the amount of deviation of the actual cam phase of the exhaust cam 7a or the amounts of deviation of the actual cam phases of the intake and exhaust cams may be calculated. Either of the these systems makes it possible to obtain the same advantageous effect as provided by the valve timing control system which calculates the amount of deviation of the actual cam phase CAIN of the intake cam 6a, described above.

Further, the parameters for detecting operating conditions of the engine are not limited to the engine rotational speed NE, the throttle valve opening θTH, and the intake pipe absolute pressure PBA, but a parameter, such as an intake air temperature TA or the like, may be also used so long as it is representative of an operating condition of the engine.

It is further understood by those skilled in the art that the foregoing is a preferred embodiment of the invention, and that various changes and modifications may be made without departing from the spirit and scope thereof.

What is claimed is:

1. A valve timing control system for an internal combustion engine having a crankshaft, an intake valve, an exhaust valve, an intake cam for opening and closing said intake valve, and an exhaust cam for opening and closing said exhaust valve, the valve timing control system controlling valve timing of at least one of said intake valve and said exhaust valve by changing a cam phase which is a phase of at least one of said intake cam and said exhaust cam, relative to said crankshaft, the valve timing control system comprising:
actual cam phase-detecting means for detecting said cam phase as an actual cam phase:
a cam phase change mechanism for changing said cam phase:
operating condition-detecting means for detecting operating conditions of said engine;
fuel cut-off determination means for determining whether or not fuel cut-off is being carried out for cutting off supply of fuel to said engine;
desired cam phase-setting means for setting a desired cam phase according to said detected operating conditions of said engine, and fixing said desired cam phase at a constant value during said fuel cut-off;
cam phase control means for controlling said cam phase change mechanism such that said cam phase change mechanism causes said cam phase to become equal to said desired cam phase, and holds said cam phase at and after a predetermined timing during said fuel cut-off; and
actual cam phase deviation calculation means for calculating an amount of deviation of said actual cam phase based on a plurality of values of said actual cam phase detected at and after said predetermined timing during said fuel cut-off, and said constant value of said desired cam phase.

2. A valve timing control system according to claim 1, further including:
actual cam phase-integrating means for integrating an amount of change in said actual cam phase before said fuel cut-off to obtain an integrated value; and
calculation-permitting means for permitting said actual cam phase deviation calculation means to calculate said amount of deviation of said actual cam phase when said integrated value is equal to or larger than a predetermined value.

3. A valve timing control system according to claim 1, further including:
follow-up delay determination means for determining based on a difference between said desired cam phase and said actual cam phase whether or not there occurs a follow-up delay of said actual cam phase with respect to said desired cam phase; and second calculation-permitting means for permitting said actual cam phase deviation calculation means to calculate said amount of deviation of said actual cam phase when it is determined by said follow-up delay determination means that there does not occur said follow-up delay.

4. A valve timing control system according to claim 2, further including:

follow-up delay determination means for determining based on a difference between said desired cam phase and said actual cam phase whether or not there occurs a follow-up delay of said actual cam phase with respect to said desired cam phase; and second calculation-permitting means for permitting said actual cam phase deviation calculation means to calculate said amount of deviation of said actual cam phase when it is determined by said follow-up delay determination means that there does not occur said follow-up delay.

* * * * *